Oct. 7, 1969   J. A. KAYSER   3,470,711
LUBRICATION SYSTEM FOR A UNIVERSAL JOINT
Filed Nov. 24, 1967

INVENTOR.
JOHN A. KAYSER
BY
ATTORNEYS

United States Patent Office 3,470,711
Patented Oct. 7, 1969

3,470,711
LUBRICATION SYSTEM FOR A UNIVERSAL JOINT
John A. Kayser, Toledo, Ohio, assignor to Dana Corporation, Toledo, Ohio, a corporation of Virginia
Filed Nov. 24, 1967, Ser. No. 685,538
Int. Cl. F16d 3/41, 3/16
U.S. Cl. 64—17     4 Claims

ABSTRACT OF THE DISCLOSURE

A lubricant control mechanism in a journal cross for a Cardan-type universal joint having a one-way valve mechanism of elastomeric composition which is positioned in a lubrication channel in each trunnion of the journal cross for maintaining the lubricant in the radially outer portion of lubrication channel.

---

This invention relates to universal joints in general, and more particularly to a Cardan type universal joint. Specifically, the invention is an improvement in the lubrication structural system in such a Cardan type universal joint.

In the usual construction of a Cardan type universal joint, there is a pair of driveshaft members capable of rotation, the ends of which are in a juxtaposed relationship. The ends of each of the two driveshaft members usually have a pair of lug members in the form of a yoke extension and these ends are connected together in a torque-transmitting relationship by articulating means, such as a journal cross member. The journal cross member is drivingly secured to each such driveshaft member so as to allow angular displacement of the axes of the driveshaft members relative to each other during the transfer of torque therebetween.

In the usual construction of the journal cross, there are four radially spaced arms, the ends of which are commonly called trunnions. These four arms are generally spaced 90° from one another in a uniplanar relationship. The trunnion ends normally are fitted into bearing races, which in turn are fitted into appropriate openings in the yoke extensions of the respective driveshaft members. The inner surfaces of the bearing race members serve as the bearing surface against which the trunnion surface reacts through intermediately disposed needle bearings.

Under most constructions of journal cross members, the interior thereof is formed into various lubrication channels which extend through the length of the journal cross arms into and completely through the trunnions on these arms. These channels intersect in the central portion of the journal cross member and the space formed by this intersection serves as a central reservoir and a distribution point to the respective lubrication channels leading into the journal cross arms. This central reservoir space generally has a special channel connection to an opening in the exterior of the journal cross into which opening a zerk fitting is secured and adapted to have lubricant inserted therethrough under pressure for transmittal to the central reservoir.

Lubicant from the central reservoir is dispersed to the end of the respective lubrication channels in the trunnions of the journal cross by the initial pressure exerted on any lubricant in the reservoir when new lubricant is injected through the zerk fittings. In addition, centrifugal force experienced upon operation of the joint aids in this dispersal process. Any lubricant that reaches the extreme end of the journal cross arm in the trunnion area passes over the end faces of the trunnions through appropriate grooves in the face to the sides and bearing surfaces of the trunnion to serve as a necessary lubrication medium between the needle bearings, the trunnion surfaces, and the interior bearing cup surfaces surrounding the trunnion.

One problem with this type of lubrication arrangement is that in instances where one of the journal cross arms is in a vertical position while the universal joint is stationary and not in operation, any lubricant which has moved to the end of the journal cross arm to the trunnion will remain at such end of the lubrication channel. While a journal cross arm is in this vertical position, any liquid content or solvent in the mass of lubricant will drain therefrom back down the particular channel in the journal cross arm into the central lubrication reservoir of the journal cross. The mass of lubricant in the upper part of the lubrication channel of the journal cross arm will become solidified as a result of this resultant loss of solvent of liquid. Because of such sodification, the mass of lubricant cannot disperse properly upon operation of the universal joint, and consequently, proper lubrication between the bearing race, needle bearings and respective trunnion of the journal cross is impeded. In fact, any such solidified lubricant is rendered virtually useless by this resultant loss of solvent or liquid content.

At present, there are no suitable means in the universal joint art for overcoming this lubricant solidification problem, and it still remains a matter of serious concern particularly in the Cardan type universal joints.

In view of the above difficulties and problems, it is an object of this invention to provide a means for preventing loss of liquid content or solvent from any lubricant in the lubrication channels of the journal cross when the journal cross is in a stationary position.

It is a further object of this invention to provide means for improving the lubrication distribution system in a Cardan type universal joint.

Another object of this invention is to provide valve means to improve the liquid and solvent control and retention in the lubricant disposed in a journal cross of a Cardan type universal joint.

Still another object of this invention is to provide means for increasing the life and efficiency of a Cardan type universal joint.

It is also an object of this invention to provide structural means which will prevent the hardening of lubricant in the lubrication system of a Cardan type universal joint.

These and other objects of the invention will be evident from the following description and the accompanying drawings, in which.

Figure 1:
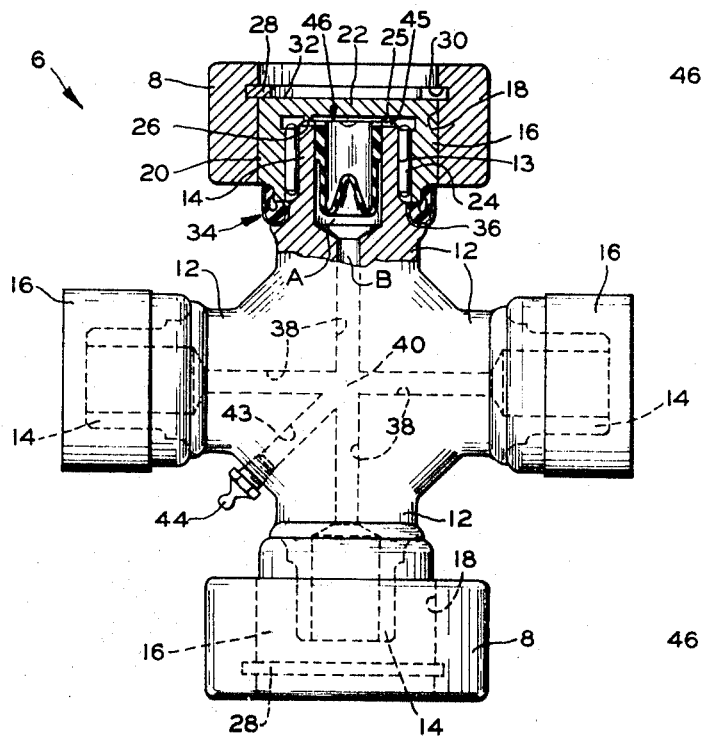
FIG. 1 is an elevational view partially in section of a journal cross incorporating this invention.

In the terminology of this specification and the claims appended thereto, the words radial and axial will be used, and for this purpose, the word axial shall be used in reference to the axis of rotation of the universal joint connecting the driveshaft members, and the term radial shall be construed as a direction extending perpendicular relative to such axis of rotation, unless such terms are specifically defined otherwise.

In general, in a preferred embodiment of the subject invention, the journal cross has four radially extending arms which are equally spaced relative to one another in a common plane. At the end of each journal cross arm there is a trunnion which has a bearing surface on the outer portions thereof; the trunnion in turn is adapted to fit into a bearing race containing an annulus of needle bearings. The trunnion is, as a consequence, rotatably mounted in the bearing race, and the bearing race covering the respective trunnion is securely fitted into an opening in a lug of a yoke arm extension of a driveshaft member.

Each journal cross arm has an internal lubrication channel which extends radially and throughout the entire length of the arm from an opening in the end of the trunnion arm to a central cavity in the journal cross. This latter central cavity serves as a lubrication reservoir for all four lubrication channels. A special channel leads from the lubrication reservoir to an opening in the exterior of the journal cross at a surface area where the respective journal cross arms meet. Disposed in each of the lubrication channels is a one-way valve which serves to allow lubricant to move radially outwardly to the end of the trunnion, but not radially inwardly.

Referring now to the drawings in which a preferred embodiment of the invention is set forth, a journal cross for a Cardan type universal joint is shown generally at 6, and shown at 8 is a pair of yoke arm extensions from one driveshaft member (not shown). The journal cross member 6 is adapted to drivingly connect the respective pairs of yoke arm extensions on opposing driveshaft members.

The journal cross 6 has four radially extending arms 12 which have straight axes and are equally spaced from one another, but in a paired opposing relationship. The arms 12 are all disposed in the same plane, and as a consequence the journal cross itself is of relatively uniplanar construction. Each journal cross arm 12 has a bearing surface 13 machined on the radially outer portions of its radially disposed exterior surface. The portion of each journal cross arm 12 having the bearing surface 13 thereon is referred to as a trunnion 14, and is adapted to fit into a bearing race 16. The bearing race 16 in turn is securely disposed in an opening 18 in the respective yoke arm extension 8 for the connecting driveshaft. The bearing race 16 includes a radially elongated annular wall portion 20 and is closed at its radially outer end by a transverse wall portion 22. The annular wall portion 20 is conventionally securedly disposed in the opening 18 of lug 8 and in pressing engagement with the portion of the lug surrounding said opening. Disposed intermediate the wall portion 20 of bearing race 16 and the bearing surface 13 of the trunnion 14 is an annulus of needle bearings 24 for providing relatively low friction rotation between the trunnion 14 and the bearing race 16. The radially outer end of trunnion 14 is terminated by a transversely extending and radially outwardly facing thrust surface 25 which is disposed in a cooperative relationship with a thrust surface formed on the radially inner surface 26 of the transverse wall 22 of the bearing race 16. The usual mode of securing the bearing race 16 against radial outward movement relative to lug 8 is a snap ring 28 positioned in a groove 30 located in the outer end of each opening in lug 8 and abuttingly engaging the radially outer face 32 of the bearing cup 16.

A seal element generally shown at 34 encircles each trunnion 14 at its radially inner extremity at a shoulder portion 36 on each journal cross arm 12 located just radially inwardly of the radial inner extremity of the bearing race 16. The seal 34 serves to prevent the escape, under operating conditions, of any lubricant from the area between the bearing race 16 and trunnion 14, and also functions to prevent the ingress of dirt and other contaminants into this area.

The lubrication system in the preferred embodiment of the subject invention is described as follows. Each journal cross arm 12 has an internal lubrication channel 38 which extends through the complete radial length of the journal cross arm from the radially outer extremity 25 of the trunnion 14 to the central interior of the journal cross. Each lubrication channel 38 is axially aligned with the corresponding lubrication channel for the opposed journal cross arm 12. The four lubrication channels 38 for the four journal cross arms 12 intersect in the central interior portion of the journal cross 6, and this intersection defines a central space which is a lubrication reservoir 40. Each lubrication channel 38 is enlarged in diameter, relative to the other portions, in the area of the trunnions, there being a tapered bore section 42 leading from the enlarged diameter section A in the trunnions 14 to the smaller diameter section B of the lubrication channel 38.

Leading from the central lubrication reservoir 40 is a lubricant feed channel 43 which opens out onto the exterior portion of the journal cross intermediate a pair of journal cross arms 12. At the outer end of the lubrication feed channel 43 there is secured a zerk fitting 44 for injection of lubricant into the feed channel 43 for movement thereof into the lubrication reservoir 40. From the lubrication reservoir 40 lubricant is moved radially outward by pressure thereon induced by the pressure exerted through the zerk fitting and also by centrifugal force experienced upon operation of the joint, through the channels 38 to the radially outer extremity of the respective journal cross arm 12. Lubricant which has made its way to the end of a trunnion 14 moves over the thrust surface 25 of the ends of the trunnion through four transversely extending grooves 45 formed in the thrust surface. From this point lubricant moves into the bearing areas holding the needle bearings 24. Up to this point, the journal cross and the lubrication structural system therefor as above described have been conventional in structure and operation.

A problem with this type of lubrication system for a Cardan type universal joint is that whenever a journal cross arm 14 is in an upright position while the universal joint is stationary, the solvent or liquid content in the lubricant drips back down into the lubrication reservoir 40. As a consequence of this, a hardened mass of lubricant is left in the upper part A of the lubrication channel 38, and this resultant hardened mass of lubricant is renderen substantially useless for further lubrication purposes in the universal joint.

Figure 3:
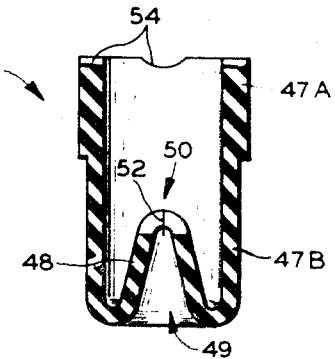
FIG. 3 is a further enlarged view of the valve mechanism shown in FIG. 1.
Figure 4:
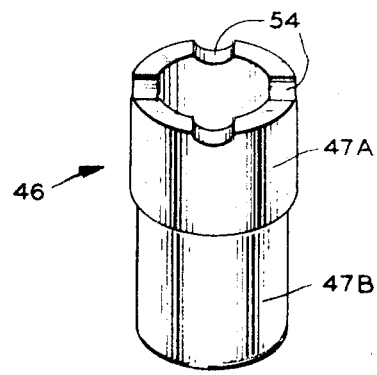
FIG. 4 is a perspective view of the one-way valve mechanism shown in FIG. 1.
Figure 2:
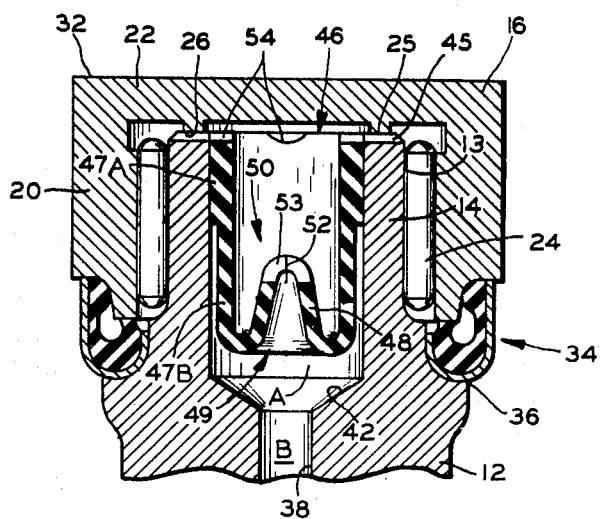
FIG. 2 is an enlarged view of the trunnion section shown in FIG. 1.
Figure 5:
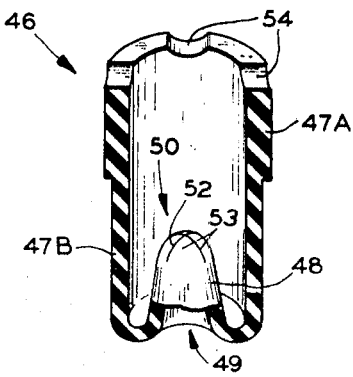
FIG. 5 is a perspective view, partially cut away, of the valve mechanism shown in FIG. 1.

Inserted in the enlarged diameter portion A of each lubrication channel is a one-way valve mechanism 46 made of an elastomeric composition, and it is desirable for purposes of this invention that the elastomeric material be capable of being molded into an accurate shape and that the material used have inherent resilience and flexibility at operating temperatures. The valve 46 is hollow and has a W-shape when viewed in cross section as seen in FIGS. 1, 2 and 3. The outside diameter of the upper portion 47A of valve 46 is slightly larger than the diameter of the enlarged diameter portion A of lubrication channel 38, and as a result the valve 46 fits snugly in portion A of each lubrication channel. The lower portion 47B of valve 46 has an outer diameter which is somewhat smaller than the diameter of the portion A of lubrication channel 38. The inner diameter of valve 46 is the same in upper portion 47A and lower portion 47B; the wall thickness of the upper portion 47A being greater than that of lower portion 47B.

At the radially inner end of valve 46, a hollow and conically shaped central section 48 is formed integrally with the radially inner end of the lower portion 47B and extends radially outwardly and into the hollow lower portion 47B. This central section 48 is concave, with an opening at its base 49, when viewed radially outwardly from area B of each lubrication channel 38. The apex 50 of the central section 48 has two razor slits 52 therein which intersect at an angle of 90°. Between adjacent slits 52 are formed lips 53, which, due to the inherent resiliency of the elastomeric material from which the valve 46 is made, tend to move together so that the slits 52 are normally closed. Upon the application of radially outwardly acting pressure on the lips 53, the lips tend to deflect away from each other so that the slits become spaced from each other and the valve 46 is in an "open" condition. The slits 52 are of sufficient length to allow the lips 53 to open a distance of a few millimeters to permit free upward motion of lubricant from area B to area A in lubrication channel 38.

In the construction of one-way valve mechanism 46, it is desirable that the dimensional characteristics thereof be carefully controlled. In particular, it is desirable that the conical portion 48 have a length which is considerably greater than the diameter of the base portion thereof in order to prevent radial collapse of the conical portion in a radially inward direction. For the same reason, the side walls of the conical portion 48 should be sufficiently thick.

The upper portion of one-way valve 46 has four semicircular notches 54 formed in the radially outer end wall 47A thereof. Each notch 54 is aligned with a corresponding one of the lubrication grooves 45 in the upper surface 25 of each trunnion 14, so that lubricant moving up through area A of lubrication channel 38 can move directly to these lubrication grooves.

In operation, lubrication moves up through area B of lubrication channel 38 as a result of pressure exerted through zerk fitting 44. With the pressure on the lubricant being increased, any lubricant in the immediate zone of area B of lubrication channel 38 will be urged radially outwardly on the inner surfaces of conical portion 48 in valve 46. This pressure will cause the lips 53 to deflect outwardly and allow each slit 52 to widen, and as a consequence, lubricant will pass through the slits 52 into area A of lubrication channel 38. Once the lubricant is in area A of channel 38 it will pass in through notches 54, to grooves 45 and thence to the area of needle bearings 24. Once pressure on the lubricant in area B of lubrication channel 38 is decreased to the point where it is equal to or less than the pressure on any lubricant radially outward of conical portion 48, the lips 53 fold back to their closed position and as a result slits 52 are closed to their naturally restricted position. Once these lips 52 are closed, no lubricant or the liquid content thereof can move back in area B to portions of channel 38 radially inwardly of valve 46, as lips 53, in conjunction with the conical structure of portion 50, will not fold radially inwardly. Rather any pressure exerted by lubricant areas radially outward of conical portion 48 will have a tendency to cause lips 53 to close slits 52 to an even tighter position than under atmospheric pressure conditions.

As a consequence of the foregoing characteristics, a one way valve is formed by which inadvertent leakage of any of the liquid content of lubricant from the radially outer portion of channel 38 back into area B is prevented.

Lubricant in the upper area of the trunnion will thus retain its necessary liquid content and consequently maintain its effectiveness over a longer period of time.

While only a single embodiment of this invention has been shown and described, it is understood that many changes can be made therein without departing from the scope of this invention as defined in the following claims.

What is claimed is:

1. In a journal cross for a Cardan type universal joint having a plurality of radially disposed arms thereon, with lubrication channels in each arm, the improvement therein comprising: a unitary independent elastomeric one-way valve sealing fitted and frictionally secured in the lubrication channel of each journal cross arm, said valve allowing movement of lubricant radially outwardly only.

2. In a journal cross for a Cardan type universal joint, in which said journal cross member has a body and four radially extending trunnion arms, and where each trunnion arm has a lubrication channel leading from a lubrication reservoir located in the body of the cross member to the radially outer extremity of each trunnion arm, the improvement comprising: (a) a valve mechanism inserted in the respective lubrication channel of each trunnion arm, (1) said valve mechanism having a first and a second portion, (i) said first portion being shaped as a hollow cylinder and having a diameter substantially equal to the diameter of the lubrication channel and sealingly secured therein, (ii) said second portion having a first end sealingly extending from said first portion and a second end, (iii) said second portion being elastomeric and said second end thereof being formed as a one-way valve means for allowing passage of lubricant in a radially outward direction only.

3. A valve mechanism as described in claim 2, in which said second end of the second portion of the valve mechanism has a valve opening in the form of intersecting slits.

4. A valve mechanism as described in claim 2, in which said first portion is cylindrically shaped and the second portion is conically shaped and projects into said first portion.

References Cited

UNITED STATES PATENTS

| 1,968,787 | 7/1934 | Slaght et al. | 64—17 |
| 2,688,979 | 9/1954 | Kendrick | 137—525.1 |
| 3,199,457 | 8/1965 | Smart | 137—525.1 |

FOREIGN PATENTS 317,990 8/1929 Great Britain.

HALL C. COE, Primary Examiner

U.S. Cl. X.R.

137—525.1